United States Patent
Jain et al.

(10) Patent No.: US 9,569,301 B2
(45) Date of Patent: *Feb. 14, 2017

(54) SYSTEM AND METHOD FOR DETECTING A NETWORK VIRTUALIZATION USING GENERIC ROUTING ENCAPSULATION (NVGRE) SEGMENT DATA PATH FAILURE

(71) Applicant: Alcatel-Lucent, Boulogne-Billancourt (FR)

(72) Inventors: Pradeep G. Jain, Sunnyvale, CA (US); Kanwar D. Singh, Sunnyvale, CA (US)

(73) Assignee: Alcatel-Lucent, Boulogne-Billancourt (FR)

( * ) Notice: Subject to any disclaimer, the term of this patent is extended or adjusted under 35 U.S.C. 154(b) by 8 days.

This patent is subject to a terminal disclaimer.

(21) Appl. No.: 13/902,200

(22) Filed: May 24, 2013

(65) Prior Publication Data

US 2014/0351645 A1    Nov. 27, 2014

(51) Int. Cl.
*H04L 12/26* (2006.01)
*G06F 11/08* (2006.01)
*H04L 12/46* (2006.01)
*H04L 12/703* (2013.01)

(52) U.S. Cl.
CPC ........... *G06F 11/08* (2013.01); *H04L 12/4633* (2013.01); *H04L 45/28* (2013.01); *H04L 2212/00* (2013.01)

(58) Field of Classification Search
CPC ....................................................... H04L 43/10
USPC ......................................................... 370/245
See application file for complete search history.

(56) References Cited

U.S. PATENT DOCUMENTS

| | | | |
|---|---|---|---|
| 7,940,695 B1 | 5/2011 | Bahadur et al. | |
| 8,504,818 B2 | 8/2013 | Rao et al. | |
| 8,510,474 B2 | 8/2013 | Aken et al. | |
| 8,510,549 B2 | 8/2013 | Rossi et al. | |
| 2002/0049856 A1* | 4/2002 | Hujber | 709/242 |
| 2005/0071494 A1 | 3/2005 | Rundquist et al. | |
| 2011/0170426 A1 | 7/2011 | Kompella et al. | |

(Continued)

FOREIGN PATENT DOCUMENTS

WO    2014189709 A1    11/2014

OTHER PUBLICATIONS

K. Kompella, et al., "Detecting Multi-Protocol Label Switched (MPLS) Data Plane Failures," Feb. 1, 2006, XP015044811, ISSN: 0000-0003, 50 pgs.

(Continued)

*Primary Examiner* — Hassan Kizou
*Assistant Examiner* — Ashil Farahmand
(74) *Attorney, Agent, or Firm* — Chiesa Shahinian & Giantomasi, PC

(57) ABSTRACT

Methods and apparatuses for determining an NVGRE data path failure are provided. In an embodiment, a first data packet comprising an echo request is generated at an originating tunnel end point device in a network. The echo request includes an NVGRE network identifier (VSID) associated with a selected NVGRE segment. A second data packet is generated comprising a header having a format associated with an NVGRE technology, the header comprising a network identifier portion including the NVGRE network identifier (VSID). The first data packet is encapsulated in the second data packet, and the second data packet is transmitted via the selected NVGRE segment.

20 Claims, 10 Drawing Sheets

(56) References Cited

U.S. PATENT DOCUMENTS

2011/0286324 A1    11/2011  Bellagamba et al.
2014/0075243 A1*    3/2014  Nagaraj ..................... 714/32

OTHER PUBLICATIONS

A. Sridharan, et al., "NVGRE: Network Virtualization using Generic Routing Encapsulation," Feb. 25, 2013, Internet Engineering Task Force, pp. 1-17.
Jain K., "Generic Overlay OAM and Datapath Failure Detection," Internet Engineering Task Force, Feb. 13, 2014, pp. 1-44.
International Search Report and Written Opinion mailed on Aug. 12, 2014, in connection with international PCT application No. PCT/US2014/037868, 14 pgs.
Farinacci, D., et al., "Generic Routing Encapsulation (GRE)," Mar. 1, 2000, ISSN: 0000-0003, 10 pgs.
Mahalingam D., et al, "VXLAN: A Framework for Overlaying Virtualized Layer 2 Networks Over Layer 3 Networks," May 8, 2013, Internet Engineering Task Force, pp. 1-22.
Young X Xu Huawei, "NVGRE and VXLAN Encapsulation for L3VPN Extension," May 21, 2013, Internet Engineering Task Force, pp. 1-7.
Aggarwal, Rahul, et al., "OAM Mechanisms in MPLS Layer 2 Transport Networks, "Oct. 1, 2004, IEEE Communications Magazine, IEEE Service Center, vol. 42, No. 10, ISSN: 0163-6804, pp. 124-130.
Harrison, Neil, et al., "OAM Functionality for MPLS Networks," Feb. 1, 2001, ISSN: 0000-0004, 29 pgs.
Singh P., "VXLAN Router Alert Option," Internet Engineering Task Force, Mar. 3, 2014, pp. 1-12.
International Search Report and Written Opinion mailed on Aug. 18, 2014, in connection with International PCT application No. PCT/US14/38474, 14 pgs.
International Search Report and Written Opinion mailed on Aug. 14 2014, in connection with international PCT application No. PCT/US2014/037792, 14 pgs.
Jain K., et al., "Detecting VXLAN Segment Failure," Jun. 8, 2013, Internet Engineering Task Force, XP015090668, pp. 1-20.
International Search Report and Written Opinion mailed on Mar. 30, 2016, in connection with International Patent Application No. PCT/US16/12969, 14 pgs.
International Search Report and Written Opinion mailed on Apr. 8, 2016, in connection with International Patent Application No. PCT/US16/12989, 14 pgs.
"Network Functions Virtualisation (NFV); Infrastructure; Network Domain," Group Specification, European Telecommunication Standards Institute (ETSI), vol. NFV INF, No. V1.1.1, Dec., 1, 2014, pp. 26-36.
Katz et al., "Bidirectional Frowarding Detection (BFD)," Internet Engineering Task Force; Internet Society 4, Jun. 1, 2010, pp. 1-49.
Luyuan et al, "BGP IP MLS VPN Virtual CE," Internet Engineering Task Force; Internet Society 4, Jul. 5, 2014, pp. 1-21.

* cited by examiner

SYSTEM AND METHOD FOR DETECTING A NETWORK VIRTUALIZATION USING GENERIC ROUTING ENCAPSULATION (NVGRE) SEGMENT DATA PATH FAILURE

TECHNICAL FIELD

The present disclosure is generally directed systems and methods for transmitting information within a communication network, and more particularly, to systems and methods for detecting a data path failure in a Network Virtualization using Generic Routing Encapsulation (NVGRE) tunneling mechanism.

BACKGROUND

NVGRE is a network virtualization technology adapted to ameliorate scalability problems associated with large cloud computing deployments. NVGRE can use, for example, Generic Routing Encapsulation (GRE) to tunnel layer 2 packets over layer 3 networks. In accordance with an NVGRE tunneling mechanism, a first device, referred to as the originating tunnel end point, uses a format associated with NVGRE protocols to encapsulate a data packet, and transmits the encapsulated packet to a second device, referred to as the terminating tunnel end point. The terminating tunnel end point decapsulates the data packet and forwards it to an intended destination device.

SUMMARY

Methods and apparatuses for detecting an NVGRE segment data path failure are provided. In accordance with an embodiment, a first data packet comprising an echo request is generated at an originating tunnel end point device in a network. The echo request includes an NVGRE virtual subnet identifier (VSID) associated with a selected NVGRE segment. A second data packet is generated comprising a header having a format associated with an NVGRE technology, the header comprising a network identifier portion including the NVGRE virtual subnet identifier (VSID). The first data packet is encapsulated in the second data packet, and the second data packet is transmitted via the selected NVGRE segment. The header may comprise a reserved portion having a predetermined bit set to a predetermined value indicative of a router alert.

In accordance with an embodiment, the first data packet may comprise a header having a format associated with an Internet Protocol technology.

In accordance with an embodiment, one of a do not reply mode or a reply via an IP packet mode may be set in the echo request.

In accordance with an embodiment, the echo request may include an assigned UDP destination port number.

In accordance with an embodiment, a data packet comprising a header having a format associated with an NVGRE technology is received at a node in a network. The data packet is determined to comprise an echo request based on a packet processing exception, wherein the echo request includes an NVGRE virtual subnet identifier (VSID) associated with a selected NVGRE segment. The node is determined to be an intended terminating tunnel end point for the selected NVGRE segment based on the NVGRE virtual subnet identifier (VSID).

In accordance with an embodiment, the packet processing exception may be one of a router alert or a destination address in a 127/8 address range.

In accordance with an embodiment, the data packet is determined to comprise an echo request based on an assigned UDP destination port number.

In accordance with an embodiment, the echo request may comprise a header having a format associated with an Internet Protocol technology.

In accordance with an embodiment, an echo reply may be generated in response to a reply via an IP packet mode in the echo request, and the echo reply may be transmitted to a sender of the echo request.

These and other advantages of the invention will be apparent to those of ordinary skill in the art by reference to the following detailed description and the accompanying drawings.

DETAILED DESCRIPTION

A method for detecting a data path failure in a Network Virtualization using Generic Routing Encapsulation (NVGRE) tunnel segment is disclosed. The detection method localizes data path faults by employing an echo request and reply format. The echo request format provides sufficient information to determine whether a data path is operating correctly (e.g., to determine whether packets are arriving at intended terminating tunnel end points), and to verify a data path against a control path. Moreover, reliable echo reply channels are determined to allow for more robust fault isolation.

Figure 1:
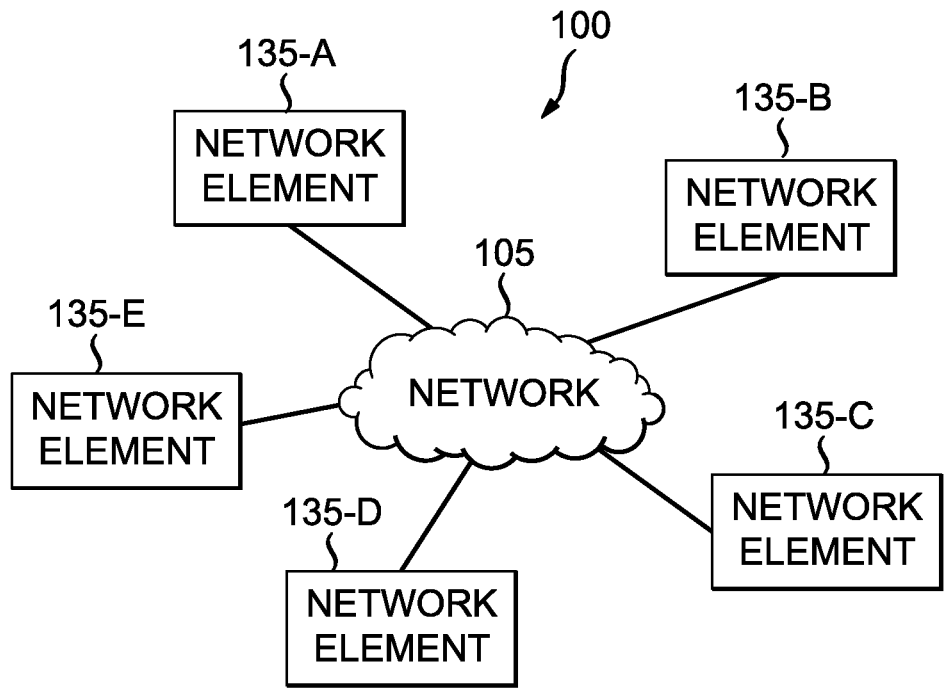
FIG. 1 shows a communication system in accordance with an embodiment.

FIG. 1 shows a communication system in accordance with an embodiment. Communication system 100 comprises a network 105, and a plurality of network elements including network elements 135-A, 135-B, 135-C, 135-D, 135-E, etc. For convenience, the term "network element 135" is used herein to refer to any one of network elements 135-A, 135-B, 135-C, 135-D and 135-E. Accordingly, any discussion herein referring to "network element 135" is equally applicable to each of network elements 135-A, 135-B, 135-C, 135-D and 135-E. It should be noted that communication system 100 may comprise more or fewer than two network elements and that "135" may refer to any one of the network elements.

Network 105 may comprise any type of network. For example, network 105 may comprise one or more of a number of different types of networks, such as, for example, the Internet, an intranet, a local area network (LAN), a wide area network (WAN), a wireless network, a Fibre Channel-based storage area network (SAN), or Ethernet. Other networks may be used. Alternatively, network 105 may comprise a combination of different types of networks.

In one embodiment, each network element 135 comprises a device connected to network 105, and is capable of communicating via network 105. For example, a network element 135 may be a server computer such as an email server, a database server, a virtual machine, a software application, etc. Alternatively, a network element 135 may be a router.

In accordance with an embodiment, at least two network elements within communication system 100 communicate using the Network Virtualization using Generic Routing Encapsulation (NVGRE) technology. NVGRE is a network virtualization technology adapted to ameliorate scalability problems associated with large cloud computing deployments. NVGRE uses Generic Routing Encapsulation (GRE) to tunnel layer 2 packets over layer 3 networks. In accordance with a NVGRE tunneling mechanism, a first device, referred to as the originating tunnel end point, uses a format associated with NVGRE protocols to encapsulate a data packet, and transmits the encapsulated packet to a second device, referred to as the terminating tunnel end point. The terminating tunnel end point decapsulates the data packet and forwards the decapsulated data from within the data packet to an intended destination device.

Figure 2:
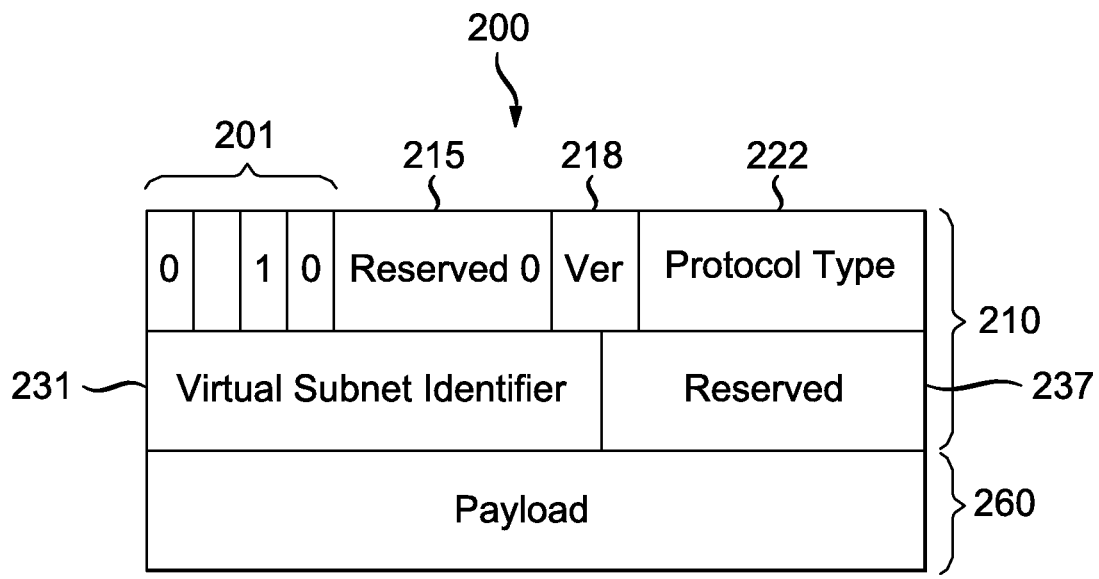
FIG. 2 shows a Network Virtualization using Generic Routing Encapsulation (NVGRE) packet.

An encapsulated NVGRE data packet comprises a header having a format that complies with NVGRE protocols. FIG. 2 shows a NVGRE packet. NVGR packet 200 comprises a header 210 and a payload 260.

In accordance with NVGR protocols, header 210 comprises a plurality of section, including an information section 201, a first reserved section 215 (referred to as the "Reserved0 section"), a version section 218, a protocol type section 222, a virtual subnet identifier section 231, and a second reserved section 237.

In accordance with an embodiment, an originating tunnel end point device inserts information at a predetermined location within the header of a NVGRE data packet in order to inform the terminating tunnel end point device that the particular data packet requires further processing. For example, originating tunnel endpoint device 320 may insert information representing an alert into the header of a NVGRE data packet.

Figure 3:
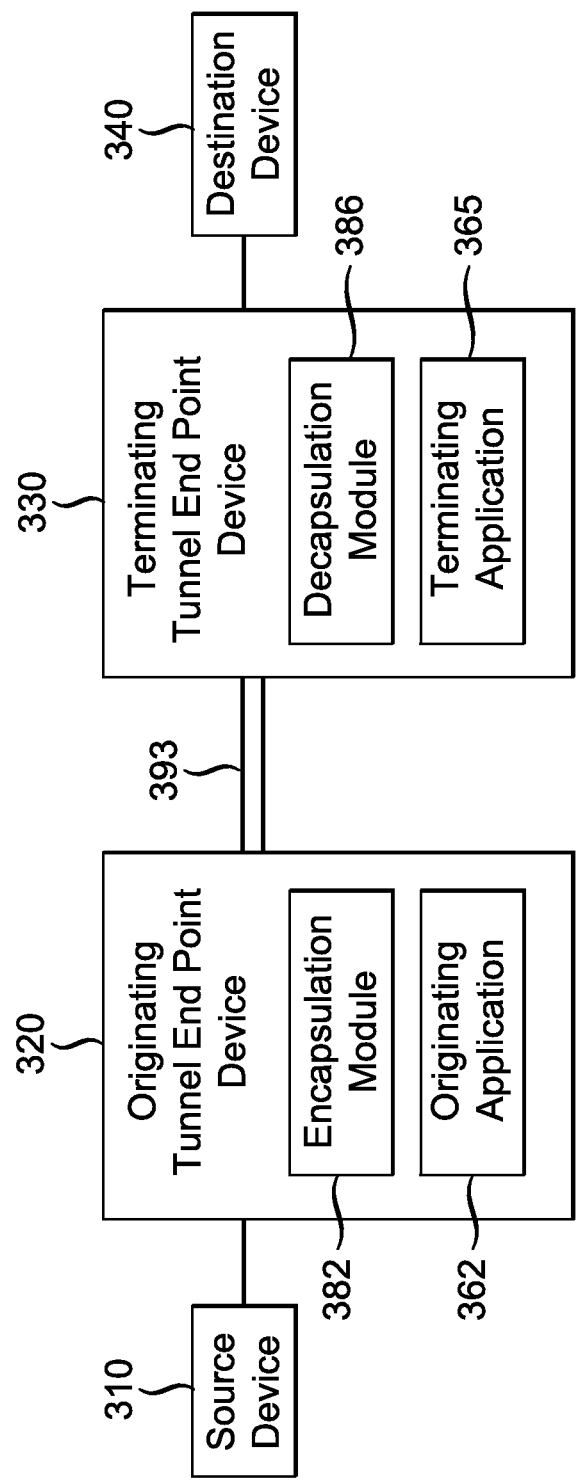
FIG. 3 shows a source device, an originating tunnel end point device, a terminating tunnel end point device, and a destination device in accordance with an embodiment.

FIG. 3 shows a source device 310, an originating tunnel end point device 320, a terminating tunnel end point device 330, and a destination device 340 in accordance with an embodiment. Source device 310, originating tunnel end point device 320, terminating tunnel end point device 330, and destination device 340 are respective network elements within communication system 100. Originating tunnel end point device 320 and terminating tunnel end point device 330 are connected via a link 393, which may be, for example, a network, or a direct connection.

Originating tunnel end point device 320 comprises an encapsulation module 382 configured to encapsulate a data packet in accordance with NVGRE protocols and transmit the NVGRE packet to a selected terminating tunnel end point device. Terminating tunnel end point device 330 comprises a decapsulation module 386 configured to decapsulate a NVGRE packet and transmit the decapsulated data from within the NVGRE packet to a selected destination device.

In accordance with an embodiment, encapsulation module 382 is further configured to insert specified information into the header of a NVGRE packet, at a predetermined location. Decapsulation module 386 is further configured to detect the presence of information at the predetermined location within the header of a NVGRE packet.

In the embodiment of FIG. 3, originating tunnel end point device 320 also comprises an originating application 362. Originating application 362 may be any type of application having any type of functionality. In the illustrative embodiment, originating application 362 is an operations, administration, and maintenance (OAM) application. For example, originating application 362 may be configured to examine incoming data packets, determine that it is necessary to insert information into a particular data packet, and instruct encapsulation module 382 accordingly. In another embodiment, originating application 362 may be a ping application configured to generate a data packet comprising a ping request, and provide the data packet to encapsulation module 382.

Similarly, terminating tunnel end point device 330 comprises a terminating application 365. Terminating application 365 may be any type of application having any type of functionality. In the illustrative embodiment, terminating application 365 is an operations, administration, and maintenance (OAM) application. For example, terminating application 365 may be configured to detect a ping message from a requesting device in network 105 and, in response, transmit a ping response message to the requesting device.

In accordance with an illustrative embodiment, source device 310 generates a data packet, for example, an Internet Protocol (IP) data packet, and transmits the IP data packet to originating tunnel end point device 320. In another embodiment, originating application 362 generates an IP data packet and transmits the IP data packet to encapsulation module 382.

Encapsulation module 382 receives the IP data packet and encapsulates the packet in accordance with NVGRE protocols, generating an NVGRE data packet. The NVGRE data packet thus includes a header similar to header 200 shown in FIG. 2.

In one embodiment, originating application 362 also instructs encapsulation module 382 to insert an alert into the NVGRE data packet.

Figure 4:
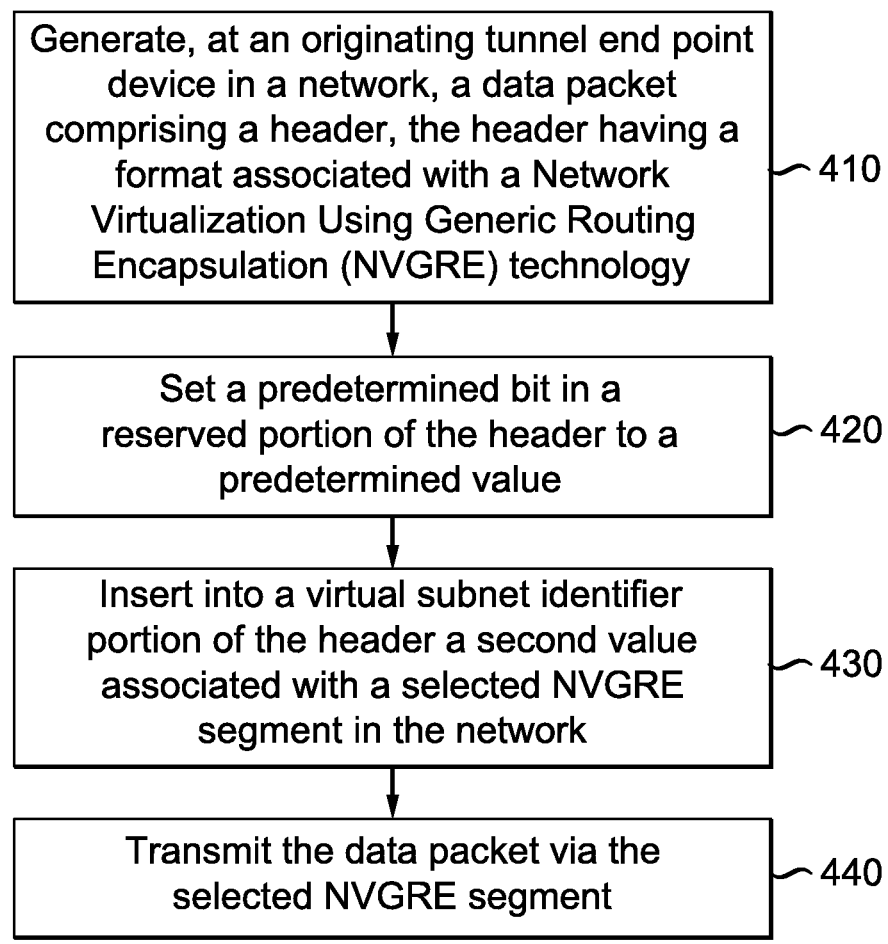
FIG. 4 is a flowchart of a method of transmitting information within a NVGRE data packet in accordance with an embodiment.

FIG. 4 is a flowchart of a method of transmitting information within a NVGRE data packet in accordance with an embodiment. In one illustrative embodiment, source device 310 generates an IP data packet, specifying destination device 340 as the intended destination, and transmits the IP data packet to originating tunnel end point device 320.

In another illustrative embodiment, originating application 362 generates a ping request, generates an IP data packet containing the ping request, and transmits the IP data packet to encapsulation module 382. Originating application 362 also instructs encapsulation module 382 to transmit an alert with the IP packet. Encapsulation module 382 receives the IP data packet and the instruction.

At step 410, a data packet comprising a header, the header having a format associated with a Network Virtualization Using Generic Routing Encapsulation (NVGRE) technology, is generated at an originating tunnel end point device in a network. Encapsulation module 382 (of originating tunnel end point device 320) encapsulates the IP data packet in accordance with NVGRE protocols, generating a NVGR packet such as that shown in FIG. 5. NVGRE packet 500 comprises a header 510 and a payload 560. For example, in one embodiment, payload 560 may include an IP packet containing a ping request generated by originating application 362. Header 510 includes an information section 501, a first reserved section 515 (referred to as the "Reserved0 section"), a version section 519, a protocol type section 522, a virtual subnet identifier section 531, and a second reserved section 537.

In the illustrative embodiment, encapsulation module 382 inserts an alert into the header of NVGRE packet 500.

Figure 5:
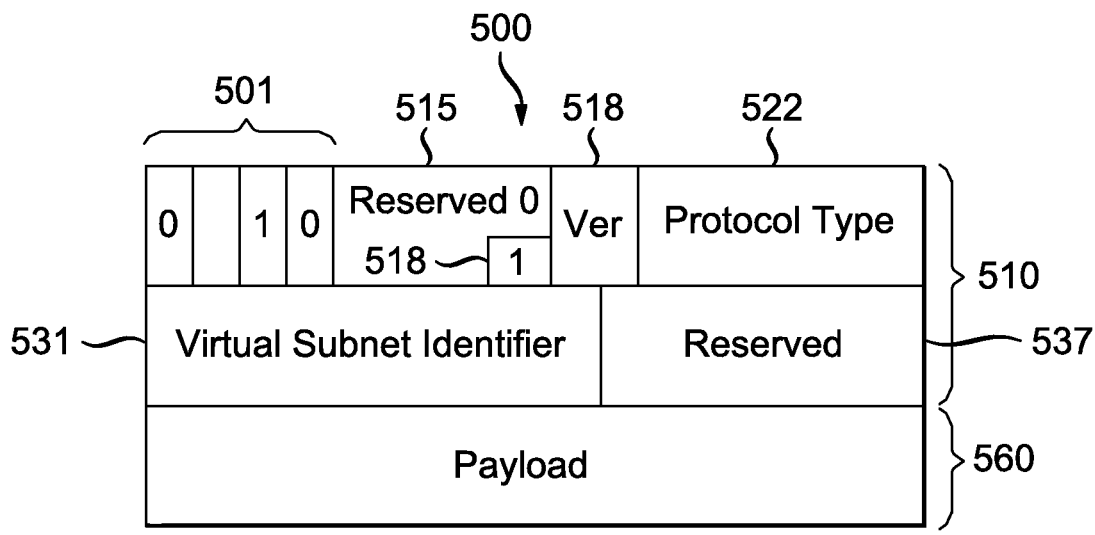
FIG. 5 shows a NVGRE packet in accordance with an embodiment.

Specifically, at step 420, a predetermined bit in a reserved portion of the header is set to a predetermined value. In the illustrative embodiment, encapsulation module 382 inserts a at bit 518 within Reserved0 portion 515 of header 510. FIG. 5 is illustrative only; in other embodiments, any bit within reserved portion 515 may be used.

At step 430, a second value associated with a selected NVGRE segment in the network is inserted into a virtual subnet identifier portion of the header. Encapsulation module 382 inserts an identifier ("VSI") associated with NVGRE segment 383 into virtual subnet identifier portion 531.

At step 440, the data packet is transmitted via the selected NVGRE segment. Originating tunnel end point device 320 transmits the NVGRE packet via link 383 (which supports the specified NVGRE segment) to terminating tunnel end point device 330.

Figure 6:
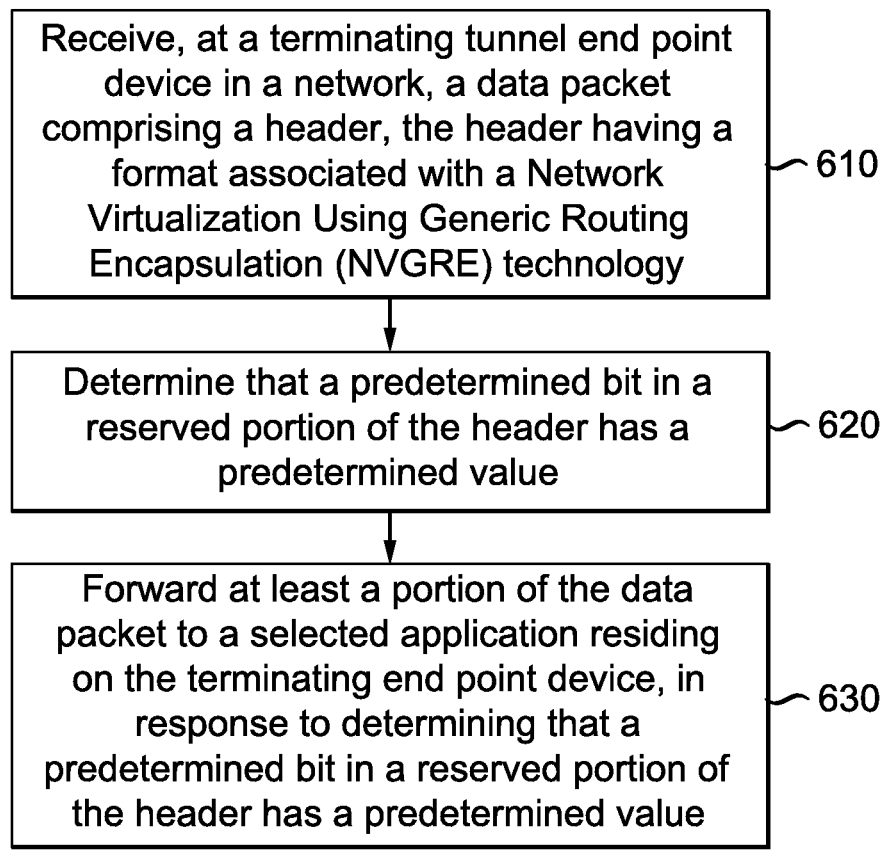
FIG. 6 is a flowchart of a method of detecting an alert within a NVGR packet and responding to the alert in accordance with an embodiment.

FIG. 6 is a flowchart of a method of detecting an alert within a NVGRE packet and responding to the alert in accordance with an embodiment. At step 610, a data packet comprising a header, the header having a format associated with a Network Virtualization Using Generic Routing Encapsulation (NVGRE) technology is received at a terminating tunnel end point device in a network. In the illustrative embodiment, terminating tunnel end point device 330 receives NVGRE packet 500. Decapsulation module 386 decapsulates packet 500.

At step 620, a determination is made that a predetermined bit in a reserved portion of the header has a predetermined value. Decapsulation module 386 detects bit 518 within reserved portion 515 of packet 500.

At step 630, at least a portion of the data packet is forwarded to a selected application residing on the terminating tunnel end point device, in response to determining that a predetermined bit in a reserved portion of the header has a predetermined value. In the illustrative embodiment, decapsulation module 386, in response to detecting bit 518, extracts payload 560 from NVGRE packet 500 and transmits payload 560 to terminating application 365.

In an illustrative embodiment, terminating application 365 receives payload 560 and determines that payload 560 comprises a ping request from originating tunnel end point device 320. In response, terminating application 365 transmits an appropriate response to originating tunnel end point device 320.

In an illustrative embodiment, terminating application 365 receives payload 560 and determines that payload 560 comprises an echo request from originating tunnel end point device 320. In response, terminating application 365 can transmit an appropriate response to originating tunnel end point device 320.

An echo application is an OAM application for verifying that packets belonging to a selected NVGRE segment (also referred to herein as a selected segment) actually end their data path at an intended terminating tunnel end point device, such as terminating tunnel end point device 330. For example, when a selected segment is suspected of failing to deliver user traffic, an echo request can enable the detection of traffic black holes or misrouting within a reasonable period of time, and provide a mechanism to isolate faults. An echo request also may be utilized for data path testing prior to mapping traffic to a selected NVGRE segment.

In an embodiment, a payload (e.g., payload 560) comprising an echo request includes identifying information regarding an NVGRE segment selected to test for data path failure and an echo reply mode. As discussed above, the echo request is transmitted via the selected segment in an NVGRE packet (e.g., NVGRE packet 500) along the same data path as other data packets routed to the selected NVGRE segment.

A packet including an echo request should be received at the end of selected NVGRE segment, e.g., at terminating tunnel end point device 330. As described above, NVGRE packet 500 is decapsulated by a decapsulation module 386. Decapsulation module 386 determines that a predetermined bit 518 in a reserved portion of the header has a predetermined value, which in the illustrative embodiment, is indicative of the echo request. In response to detecting bit 518, decapsulation module 386 extracts the payload 560 containing the echo request from NVGRE packet 500 and transmits payload 560 to terminating application 365 (which may also be referred to as the control plane of terminating tunnel end point device 330).

For a basic connectivity check, terminating application 365 determines whether terminating tunnel end point device 330 is the intended receiving node for the selected NVGRE segment. Terminating application 365 then performs a monitoring function or a reply function in accordance with an echo reply mode specified in the echo request. For example, terminating application 365 may generate an echo reply for transmission to originating tunnel end point device 320 in accordance with an echo reply mode.

Figure 7:
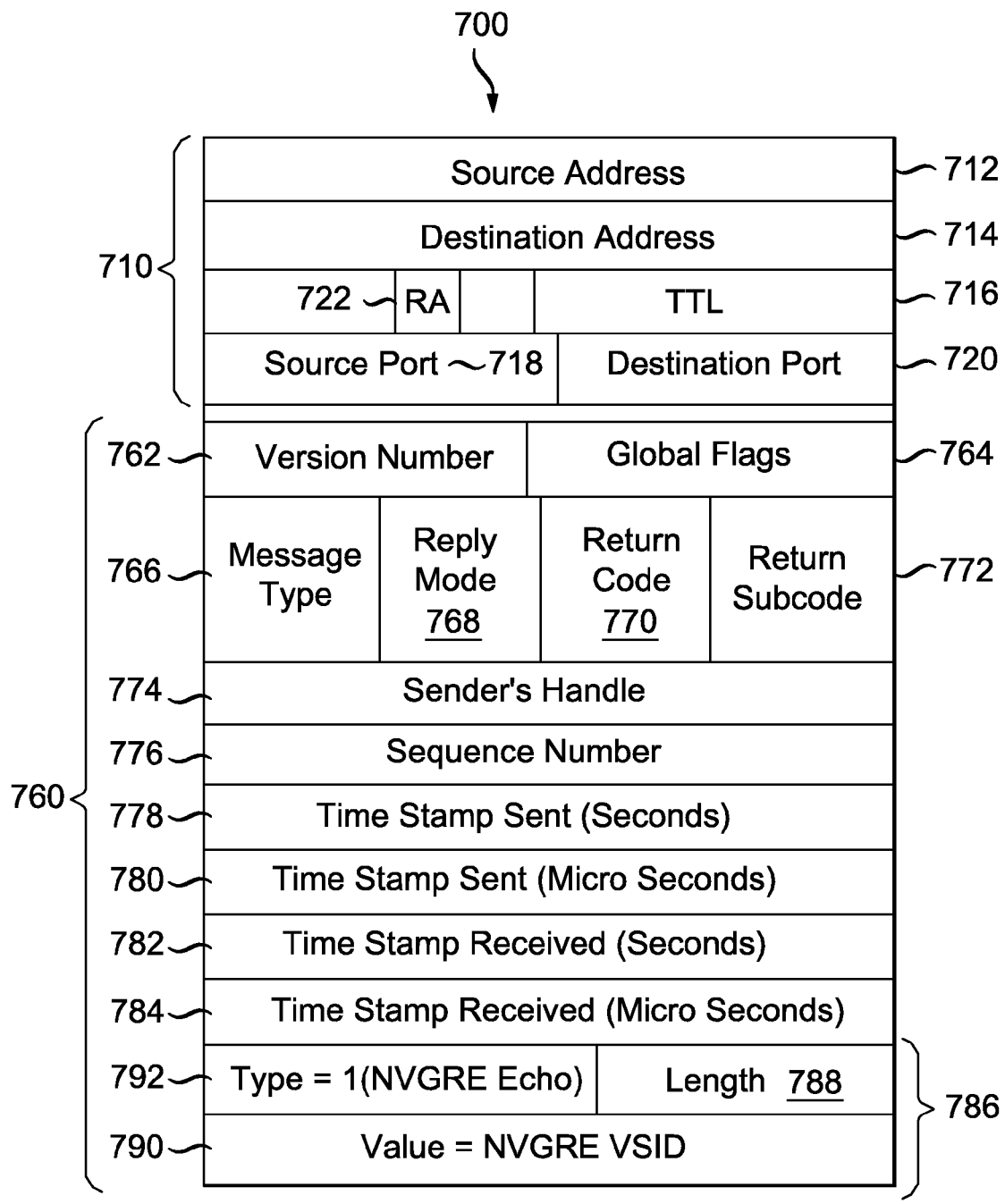
FIG. 7 shows an NVGRE echo application data packet in accordance with an embodiment.

FIG. 7 shows an NVGRE echo application data packet in accordance with an embodiment. In the illustrative embodiment, echo data packet 700 is constructed as an Internet Protocol version 4 (IPv4) User Datagram Protocol (UDP) packet. However, it should be noted that other IP protocol versions may be utilized, and the embodiments herein for constructing an echo data packet are not limited to a particular IP protocol version.

Echo data packet 700 comprises an UDP/IP header 710 and a payload 760. UDP/IP header 710 comprises a plurality of sections, including a source IP address section 712, a destination IP address section 714, an IP time-to-live (TTL) section 716, a source UDP port section 718, a destination UDP port section 720 and a router alert option 722. One skilled in the art will note that the sections depicted for UDP/IP header 710 are merely for illustrating the embodiments herein and are not intended to be exhaustive. Moreover, it will be appreciated that an UDP/IP header may comprise various sections or sub-sections in addition to those depicted.

In echo data packet 700, the source IP address 712 identifies the routable address of the sender, e.g., originating tunnel end node device 320. The destination IP address 714 may be randomly chosen to create a processing exception. For example, the destination IP address 714 may be an IPv4 address from the range 127/8 or an IPv6 address from the range 0:0:0:0:0:FFFF:127/104.

The IP (Time-to-Live) TTL 716 limits the lifespan or lifetime of data in the network. The maximum TTL value is 255, the maximum value of a single octet.

Source UDP port section 718 identifies any free port number selected on the originating node, e.g., originating tunnel end point device 320, for use by the echo request/reply application. For example, source UDP port section 718 can be used to identify a destination port number for an echo reply (e.g., in accordance with a selected echo reply mode).

Destination UDP port section 720 identifies a port number on the destination node that is assigned to an echo request/reply application. For example, destination UDP port 720 can be a value assigned by the Internet Assigned Numbers Authority (IANA) for NVGRE echo requests.

The router alert option 722 may be set to indicate to the destination node that further processing is required. For example, router alert option 722 may be a predetermined bit assigned to a reserved portion of header 710.

In accordance with IPv4 UDP, payload 760 comprises a plurality of sections, including a version number section 762, a global flags section 764, a message type section 766, a reply mode section 768, a return code section 770, a return subcode section 772, a sender's handle section 774, a sequence number section 776, a time stamp sent in seconds section 778, a time stamp sent in microseconds section 780, a time stamp received in seconds section 782, a time stamp received in microseconds section 784, and a time, length and value (TLV) section 786.

In an embodiment, when message type section 766 is set to a value representing an echo request, reply mode section 768 can be set to various selected values, including: (1) do not reply; and (2) reply via an IPv4 UDP packet.

A do not reply value may be used for one-way connectivity tests. For example, in do not reply mode terminating tunnel end point device 330 will not transmit an echo reply to originating tunnel end point device 320 (i.e., the sender of the echo request). However, the terminating tunnel end point device 330 may log gaps in the sequence numbers 776 of multiple echo requests, maintain delay/jitter statistics or track other metrics related to the selected NVGRE segment.

A reply via an IPv4 UDP packet value indicates a request for an echo reply from terminating tunnel end point device 330. It should be noted that for an echo reply to be successful, all intermediate nodes need to be equipped with information necessary to be able to forward echo replies. As such, an echo reply (as described below) uses the same IP version as a received echo request, e.g., an IPv4 encapsulated echo reply is sent in response to an IPv4 encapsulated echo request. Further, a reply via an IPv4 UDP packet with router alert value can be selected to request an echo reply if a normal IP return path is deemed to be unreliable.

Sender's handle section 774 is assigned a value by the sender (e.g., originating tunnel end point device 320) of the echo request and returned unchanged by the receiver in an echo reply (if any). In general, no semantics are associated with sender's handle section 774, although a sender may use this field to match previously sent echo requests with received echo replies.

Sequence number section 776 is also assigned a value (i.e., a sequence number) by the sender of the echo request. For example, the sequence numbers of a plurality of echo requests can be used to detect missed echo replies or echo replies not received.

The time stamp sent in seconds section 778 and the time stamp sent in microseconds section 780 indicate the time of day in Network Time Protocol (NTP) format when an echo request is sent according to the sender's clock. The time stamp received in seconds section 782 and the time stamp received in microseconds section 784 indicate, in an echo reply, the time of day in NTP format when a corresponding echo request was received according to the receiver's clock.

In TLV section 786, the length section 788 indicates the length of value section 790 in octets, while value section 790 depends on type section 792. For example, value section 790 can be zero-padded to align to a 4-octet boundary. For example, the values for a TLV section in an echo request can be Type=1 (NVGRE echo), Length=5 and Value=NVGRE VSID, as shown.

In an embodiment, a TLV section may be nested within another TLV section, in which case the nested TLV section comprises a sub-TLV section. A sub-TLV section can have independent values in type field 792 with respect to a corresponding TLV section, and can also be 4-octet aligned.

As noted above, an echo request can be used to test a selected NVGRE segment, which may be identified by an NVGRE virtual subnet identifier (VSID). As such, the sub-TLV section can be used to contain information that uniquely identifies a selected segment. When an echo request is received, the receiving node can verify that a control plane and a data plane of the selected NVGRE segment are operating normally and are in sync.

Figure 8:
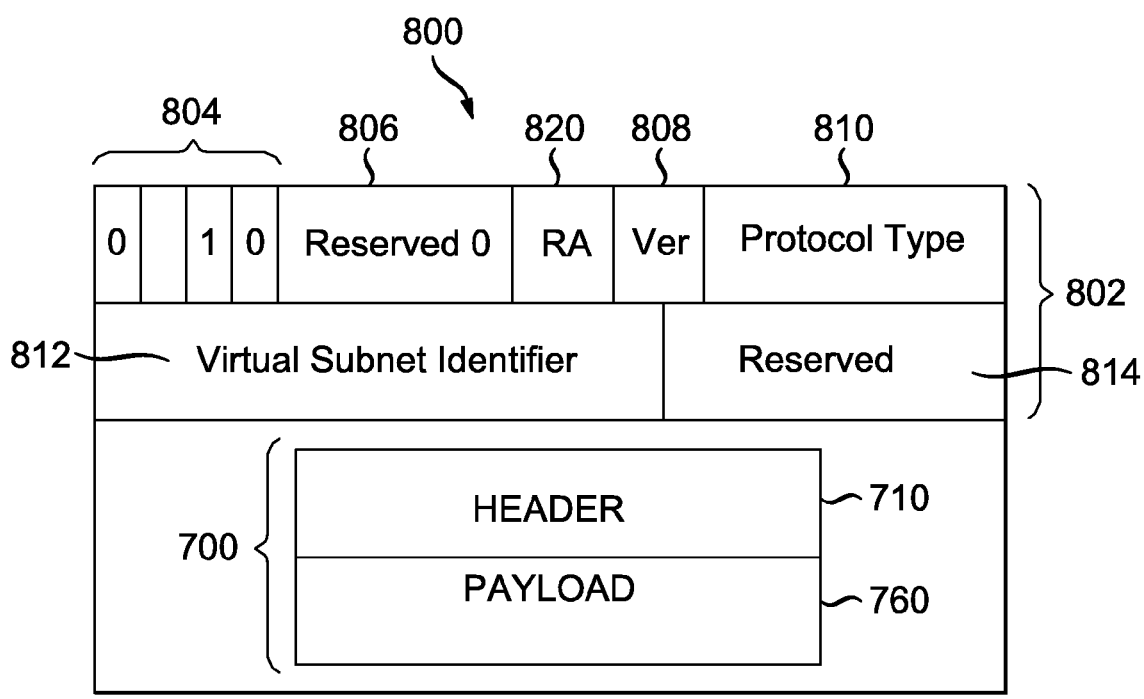
FIG. 8 shows an NVGRE data packet encapsulating an echo request in accordance with an embodiment.

FIG. 8 shows an NVGRE data packet encapsulating an echo request in accordance with an embodiment. For NVGRE echo requests, Echo data packet 700 is encapsulated in an NVGRE packet 800. NVGRE packet 800 is similar to NVGRE packet 500 described above. As such, the header 802 of NVGRE packet 800 includes an information section 804, a first reserved section 806 (referred to as the "Reserved0 section"), a version section 808, a protocol type section 810, a virtual subnet identifier section 812, a second reserved section 814, and a router alert bit 820 (similar to predetermined bit 518) that is set to alert a receiving node that the NVGRE packet includes a router request for further processing. In an embodiment, NVGRE virtual subnet identifier section 812 includes the same VSID value as value section 790 of echo request payload 760.

Figure 9:
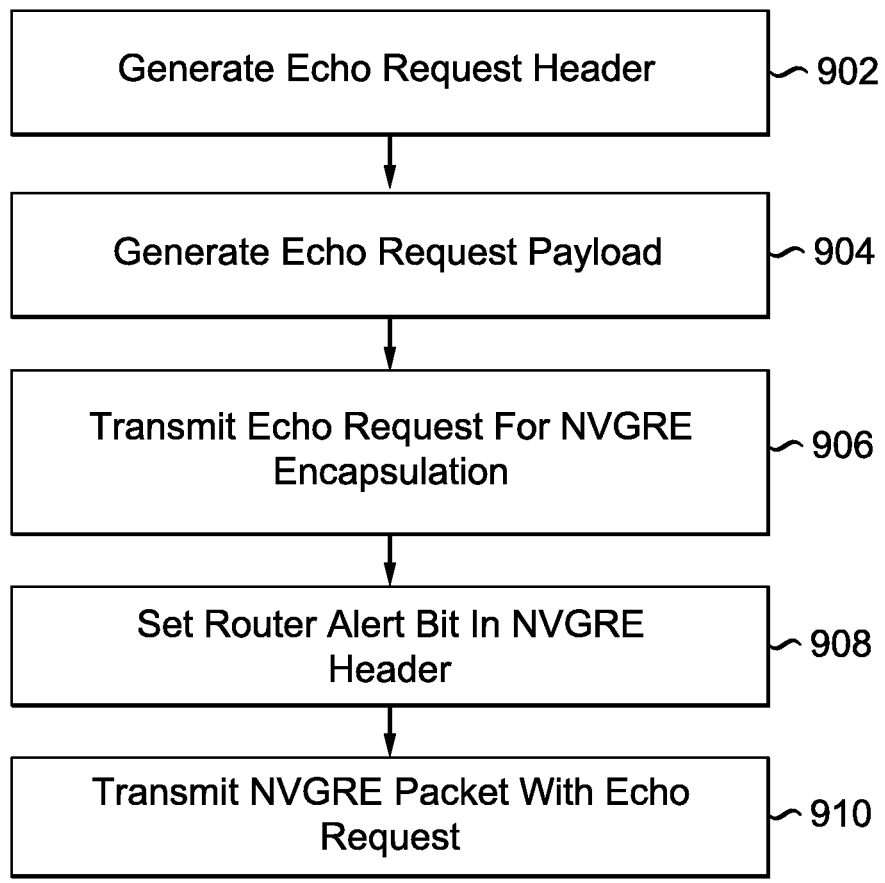
FIG. 9 is a flowchart of a method of generating an NVGRE echo request in accordance with an embodiment.

FIG. 9 is a flowchart of a method of generating an NVGRE echo request in accordance with an embodiment. As noted above, originating application 362 may be an echo application configured to generate a data packet comprising an echo request. As such, originating application 362 may generate an UDP/IP header, such as UDP/IP header 710, for an echo request in response to an indication of a data path failure at 902. For example, originating application 362 may the set source IP address 712 to be the routable address of the sender, e.g., originating tunnel end node device 320, the destination IP address 714 to a randomly chosen IPv4 address from the range 127/8 or IPv6 address from the range 0:0:0:0:0:FFFF:127/104; and the IP TTL 716 to 255. Originating application 362 may also select the source UDP port 718, and set the destination UDP port 720 to an assigned value, e.g., a value assigned by the Internet Assigned Numbers Authority (IANA) for NVGRE echo requests. The Router Alert option 722 is set to indicate to the destination node that further processing is required.

At 904, originating application 362 generates an echo request payload, such as echo request payload 760. As shown in FIG. 7, echo request payload 760 includes a VSID corresponding to the selected NVGRE segment being tested. In addition, payload 760 includes a sender's handle 774 and a sequence number 776 selected by the sender. For example, when sending subsequent echo requests, originating tunnel end node device 320 may increment the sequence number for each subsequent echo request. Alternatively, originating tunnel end node device 320 may choose to send a plurality of echo requests with identical sequence numbers to improve the chance of arrival of at least one packet having a particular sequence number.

The time stamp sent in seconds section 778 and the time stamp sent in microseconds section 780 are set to the time of day (in seconds and microseconds, respectively) that the echo request is sent by originating tunnel end node device 320. The time stamp received in seconds section 782 and the time stamp received in microseconds section 784 are set to zero. The return code section 770 and return subcode section 772 are also set to zero.

In an embodiment, originating application 362 selects a desired reply mode for an echo request. As described above, reply mode section 768 can be set to instruct a receiving node to perform various functions upon receipt of the echo request. For example, reply mode section 768 may include reply indicator values, including: (1) do not reply; and (2) reply via an IPv4 UDP packet.

At 906, originating application 362 transmits the echo request to encapsulation module 382 for encapsulation into an NVGRE packet, such as NVGRE packet 800, and instructs encapsulation module 382 to insert predetermined information into the NVGRE packet. In response, at 908 encapsulation module 382 sets the router alert bit 820 within header 802 of NVGRE packet 800.

At 910, the NVGRE packet encapsulating the NVGRE echo request is transmitted via the selected NVGRE segment. For example, originating tunnel end point device 320 transmits the NVGRE packet via link 393 (which serves as the selected NVGRE segment) to terminating tunnel end point device 330.

Figure 10:
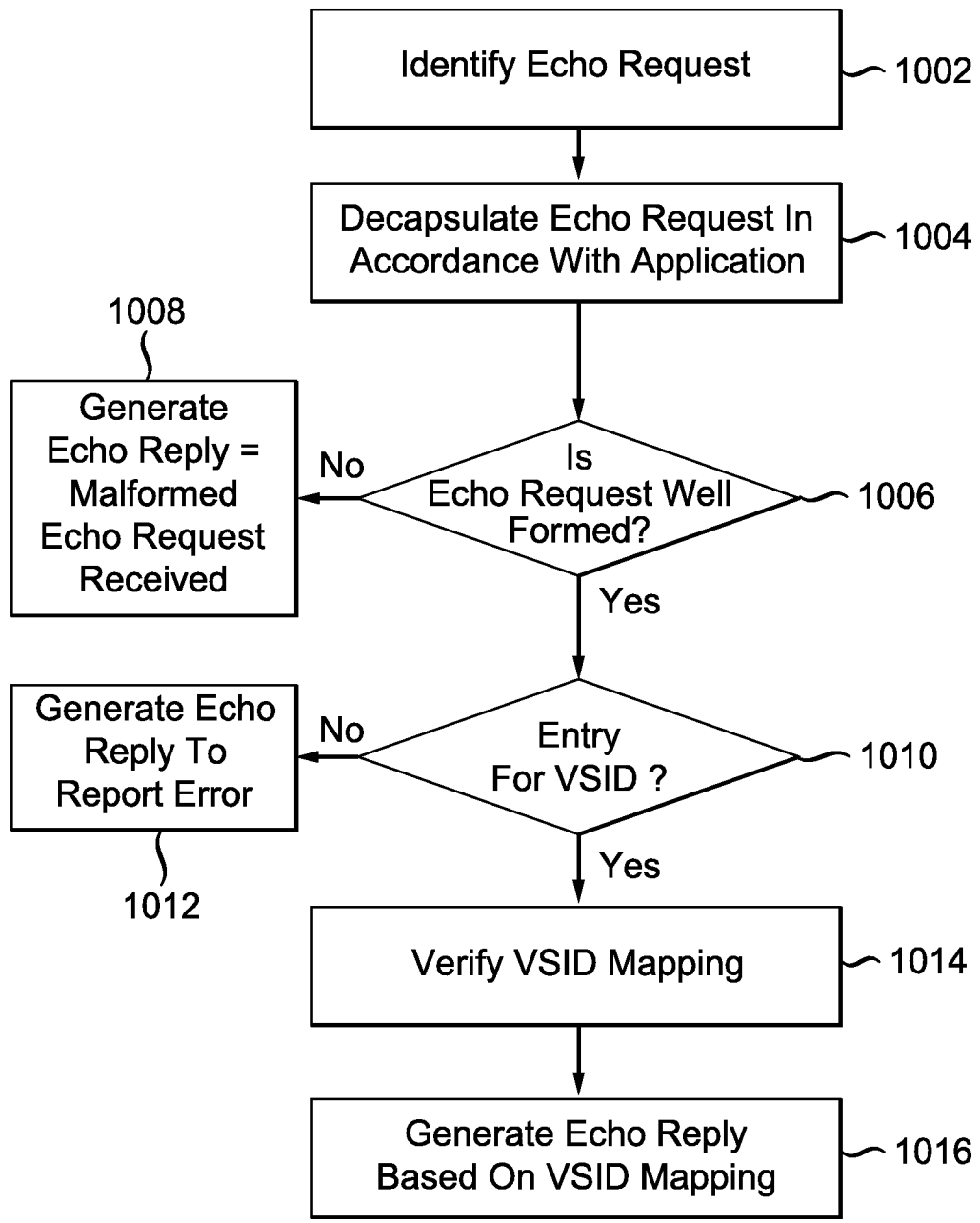
FIG. 10 is a flowchart of a method of receiving an NVGRE echo request in accordance with an embodiment.

FIG. 10 is a flowchart of a method of receiving an NVGRE echo request in accordance with an embodiment. At 1002, an echo request is identified at a receiving node, such as terminating tunnel end point device 330. When terminating tunnel end point device 330 receives an NVGRE packet 800 including an echo request, decapsulation module 386 may identify the echo request payload, either as described in FIG. 6 above, or based on one or more packet processing exceptions. For example, packet processing exceptions may include a router alert (e.g., via router alert bit 804), a destination address in the 127/8 address range, or other anomalies that may distinguish an echo request packet from a normal traffic packet. Moreover, an echo request may be identified by UDP destination port 720 being set to a value assigned by IANA for NVGRE echo requests.

Upon identification, decapsulation module 386 decapsulates the echo request from the NVGRE packet in accordance with terminating application 365 at 1004. At 1006, terminating application 365 verifies the integrity of the echo request by determining if the echo request is well-formed. If the echo request is not well-formed (e.g., corrupted), terminating application 365 generates an echo reply at 1008. For example, the return code section 770 of the NVGRE echo reply may be set to "malformed echo request received" and the return subcode section 772 may be set to zero. In such case, the header section, sender's handle, sequence number, and time stamp sent sections may not be examined, although they may be included in the echo reply.

If the packet is well-formed, the terminating application 365 validates the echo request by determining if the echo request includes a VSID entry at 1010. If there is no entry for VSID in the echo request, the terminating application 365 determines that a temporary or permanent VSID synchronization problem exists and generates an echo reply to report the error at 1012. If the echo request includes a VSID entry, terminating application 365 verifies the VSID mapping at 1014. The VSID mapping can describe how traffic received on the NVGRE segment is further processed, and identify the application to which the traffic is associated. If no VSID mapping exists, terminating application 365 sets return code section 770 to indicate that the replying node has no mapping for the VSID. If the VSID mapping exists, terminating application 365 generates an echo reply with return code section 770 indicating a best-return-code, and return subcode section 772 indicating a best-return-subcode. Terminating application 365 generates an echo reply based on the VSID mapping at 1016.

Figure 11:
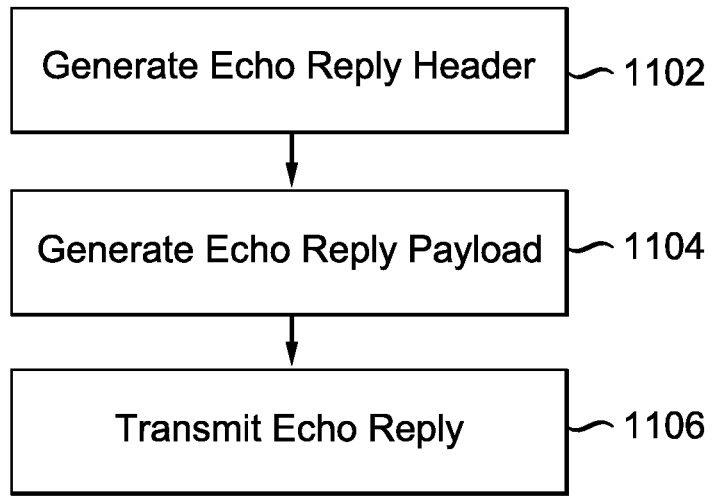
FIG. 11 is a flowchart of a method of generating an echo reply in accordance with an embodiment.

FIG. 11 is a flowchart of a method of generating an echo reply data packet in accordance with an embodiment. An echo reply can be a UDP/IP packet generated in response to an NVGRE echo request, e.g., by terminating application 365. For example, an echo request may instruct a receiving node to reply, e.g., via an IPv4 UDP packet.

As such, terminating application 365 generates an IP header for an echo reply at 1102. For example, terminating application 365 may set the source IP address to the routable address of the replying node (e.g., terminating tunnel end point node 330) and the source port may be set to a predetermined UDP port for NVGRE echo. The destination IP address and UDP port may be copied from the source IP address and UDP port of the echo request. The IP TTL may be set to 255. If reply mode section 768 in the echo request is set to reply, then terminating application 365 may instruct module 386 (now configured for encapsulation) to set the UDP/IP header router alert option 722.

Terminating application 365 may generate the echo reply payload in a manner similar to the echo request described in FIG. 7 at 1104. For example, terminating application 365 may copy values for the sender's handle 774, the sequence number 776, and time stamp sent 778 and 780 from the echo request. The time stamp received values 782 and 784 may be set to the time of day that the echo request is received. Terminating application 365 also sets the return code 770 and return subcode 772 values, as determined above in FIG. 9. The echo reply is transmitted at 1106. Alternatively, an echo reply may be encapsulated in an NVGRE packet for transmission, such as the echo request described above.

Figure 12:
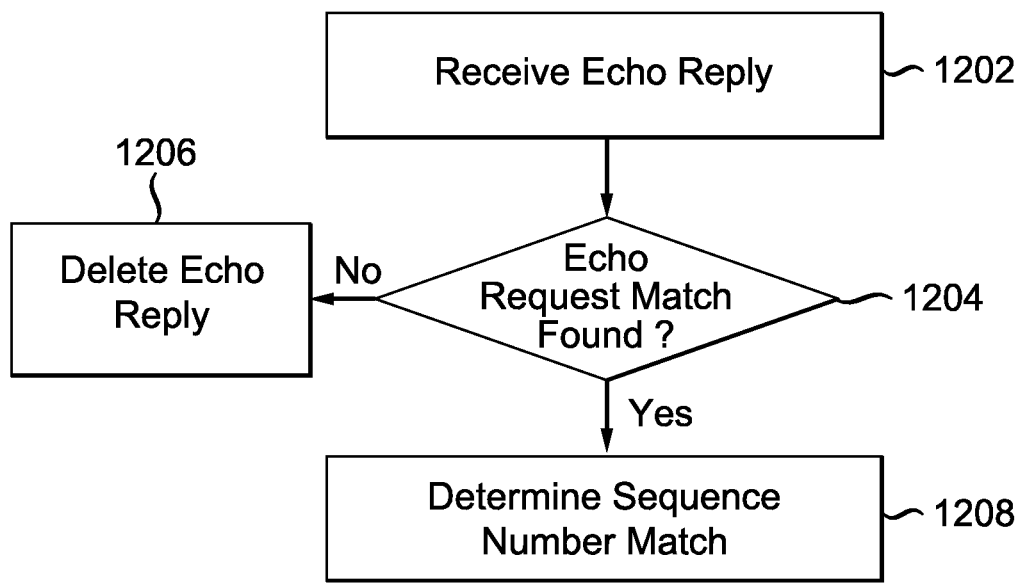
FIG. 12 is a flowchart of a method of receiving an echo reply in accordance with an embodiment.

FIG. 12 is a flowchart of a method of receiving an echo reply in accordance with an embodiment. A receiving node (e.g., originating tunnel end point device 320) should only receive an echo reply in response to a previously sent echo request. As such, at 1202 upon receipt of a well-formed echo reply at either encapsulation module 382 or originating application 362, originating application 362 determines if the echo reply matches (corresponds to) a previously sent echo request based on the destination UDP port 720 and the sender's handle 774 values of the echo reply at 1204. If no match is found, the echo reply is deleted at 1206. Otherwise, originating application 362 determines the particular sequence number match with a corresponding sequence number of a previously sent echo request at 1208.

In various embodiments, the method steps described herein, including the method steps described in FIGS. 4, 6, 9, 10, 11 and/or 12 may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 4, 6, 9, 10, 11 and/or 12. Certain steps of the methods described herein, including one or more of the steps of FIGS. 4, 6, 9, 10, 11 and/or 12, may be performed by a server or by another processor in a network-based cloud-computing system. Certain steps of the methods described herein, including one or more of the steps of FIGS. 4, 6, 9, 10, 11 and/or 12, may be performed by a client computer in a network-based cloud computing system. The steps of the methods described herein, including one or more of the steps of FIGS. 4, 6, 9, 10, 11 and/or 12, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4, 6, 9, 10, 11 and/or 12, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 13:
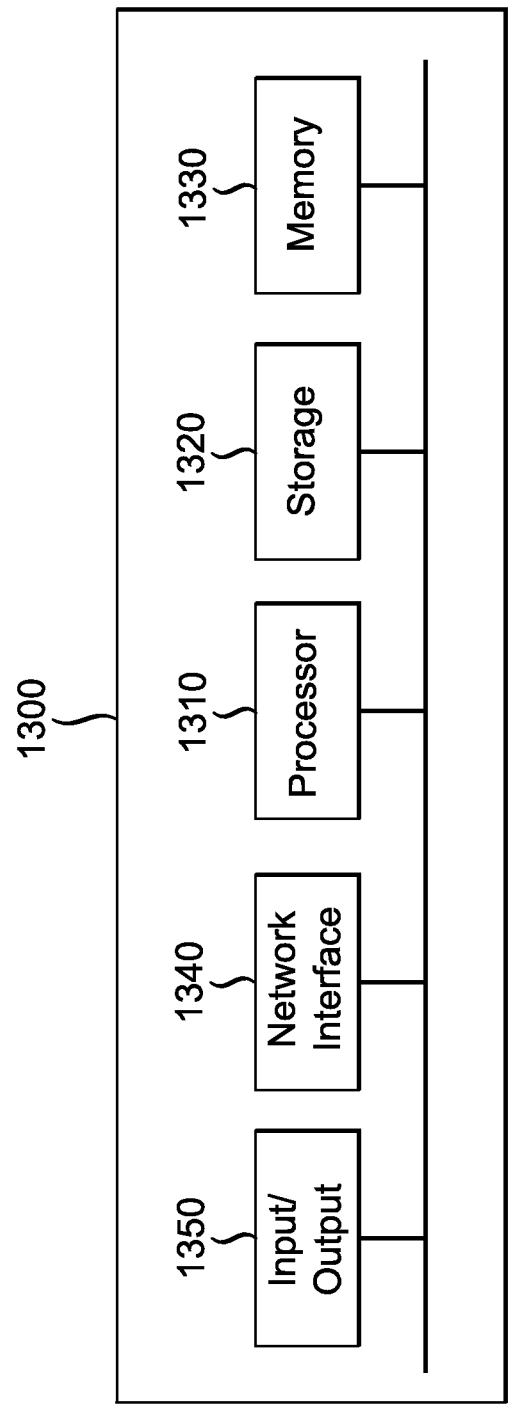
FIG. 13 shows components of an exemplary computer that may be used to implement certain embodiments of the invention.

A high-level block diagram of an exemplary computer that may be used to implement systems, apparatus and methods described herein is illustrated in FIG. 13. Computer 1300 comprises a processor 1310 operatively coupled to a data storage device 1320 and a memory 1330. Processor 1310 controls the overall operation of computer 1300 by executing computer program instructions that define such operations. The computer program instructions may be stored in data storage device 1320, or other computer readable medium, and loaded into memory 1330 when execution of the computer program instructions is desired. Thus, the method steps of FIGS. 4, 6, 9, 10, 11 and/or 12 can be defined by the computer program instructions stored in memory 1330 and/or data storage device 1320 and controlled by the processor 1310 executing the computer program instructions. For example, the computer program instructions can be implemented as computer executable code programmed by one skilled in the art to perform an algorithm defined by the method steps of FIGS. 4, 6, 9, 10, 11 and/or 12. Accordingly, by executing the computer program instructions, the processor 1310 executes an algorithm defined by the method steps of FIGS. 4, 6, 9, 10, 11 and/or 12. Computer 1300 also includes one or more network interfaces 1340 for communicating with other devices via a network. Computer 1300 also includes one or more input/output devices 1350 that enable user interaction with computer 1300 (e.g., display, keyboard, mouse, speakers, buttons, etc.).

Processor 1310 may include both general and special purpose microprocessors, and may be the sole processor or one of multiple processors of computer 1300. Processor 1310 may comprise one or more central processing units (CPUs), for example. Processor 1310, data storage device 1320, and/or memory 1330 may include, be supplemented by, or incorporated in, one or more application-specific integrated circuits (ASICs) and/or one or more field programmable gate arrays (FPGAs).

Data storage device 1320 and memory 1330 each comprise a tangible non-transitory computer readable storage medium. Data storage device 1320, and memory 1330, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1350 may include peripherals, such as a printer, scanner, display screen, etc. For example, input/output devices 1350 may include a display device such as a cathode ray tube (CRT) or liquid crystal display (LCD) monitor for displaying information to the user, a keyboard, and a pointing device such as a mouse or a trackball by which the user can provide input to computer 1300.

Any or all of the systems and apparatus discussed herein, including network element 135, source device 310, originating tunnel end point device 320, terminating tunnel end point device 330, and destination device 340, and components thereof, including encapsulation module 382, originating application 362, decapsulation module 386, and terminating application 365, may be implemented using a computer such as computer 1300.

One skilled in the art will recognize that an implementation of an actual computer or computer system may have other structures and may contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method for determining an NVGRE data path failure, the method comprising:
    generating, at an originating tunnel end point device in a network, a first data packet comprising an echo request, the echo request including an NVGRE virtual subnet identifier (VSID) located in a payload portion of the echo request, wherein the NVGRE VSID identifies a selected NVGRE segment and is used to generate an echo reply in response to the echo request;
    generating a second data packet comprising a header having a format associated with an NVGRE technology, the header comprising a network identifier portion including the NVGRE VSID;
    encapsulating the first data packet in the second data packet;
    transmitting the second data packet to a destination node via the selected NVGRE segment;
    receiving the echo reply in response to transmitting the second data packet to the destination node, the echo reply including a port number of the destination node; and
    determining whether there is a failure in the selected NVGRE segment by matching the echo reply with the echo request based on the port number.

2. The method of claim 1, wherein the header of the second data packet comprises a reserved portion having a predetermined bit set to a predetermined value indicative of a router alert.

3. The method of claim 1, wherein the first data packet comprises a header having a format associated with an Internet Protocol technology.

4. The method of claim 1, further comprising setting one of a do not reply mode or a reply via an IP packet mode in the echo request.

5. The method of claim 1, wherein the echo request in the first data packet includes the port number of the destination node.

6. A method comprising:
    receiving, at a destination node in a network, a data packet comprising a header having a format associated with an NVGRE technology, the header comprising a network identifier portion including an NVGRE virtual subnet identifier (VSID);
    determining that the data packet comprises an echo request based on a packet processing exception, wherein the echo request includes the NVGRE VSID located in a payload portion of the echo request, wherein the NVGRE VSID identifies a selected NVGRE segment and is used to generate an echo reply in response to the echo request; and
    determining that the destination node is an intended terminating tunnel end point for the selected NVGRE segment based on the NVGRE VSID;
    in response to determining that the destination node is the intended terminating tunnel end point for the selected NVGRE segment, generating the echo reply, the echo reply including a port number of the destination node, wherein the echo reply is matched with the echo request based on the port number to determine whether there is a failure in the selected NVGRE segment.

7. The method of claim 6, wherein the packet processing exception is one of a router alert or a destination address in a 127/8 address range.

8. The method of claim 6, wherein the echo request in the data packet includes the port number of the destination node.

9. The method of claim 6, wherein the echo request comprises a header having a format associated with an Internet Protocol technology.

10. The method of claim 6, further comprising:
    generating the echo reply in response to a reply via an IP packet mode in the echo request; and
    transmitting the echo reply to a sender of the echo request.

11. A non-transitory computer readable medium having program instructions stored thereon, that, in response to execution by a processor, cause the processor to perform operations comprising:
    generating, at an originating tunnel end point device in a network, a first data packet comprising an echo request, the echo request including an NVGRE virtual subnet identifier (VSID) located in a payload portion of the echo request, wherein the NVGRE VSID identifies a selected NVGRE segment and is used to generate an echo reply in response to the echo request;
    generating a second data packet comprising a header having a format associated with an NVGRE technology, the header comprising a network identifier portion including the NVGRE VSID;
    encapsulating the first data packet in the second data packet;
    transmitting the second data packet to a destination node via the selected NVGRE segment;
    receiving the echo reply in response to transmitting the second data packet to the destination node, the echo reply including a port number of the destination node; and
    determining whether there is a failure in the selected NVGRE segment by matching the echo reply with the echo request based on the port number.

12. The non-transitory computer readable medium of claim 11, wherein the header of the second data packet comprises a reserved portion having a predetermined bit set to a predetermined value indicative of a router alert.

13. The non-transitory computer readable medium of claim 11, wherein the first data packet comprises a header having a format associated with an Internet Protocol technology.

14. The non-transitory computer readable medium of claim 11, the operations further comprising setting one of a do not reply mode or a reply via an IP packet mode in the echo request.

15. The non-transitory computer readable medium of claim 11, wherein the echo request in the first data packet includes the port number of the destination node.

16. A non-transitory computer readable medium having program instructions stored thereon, that, in response to execution by a processor, cause the processor to perform operations comprising:
- receiving, at a destination node in a network, a data packet comprising a header having a format associated with an NVGRE technology, the header comprising a network identifier portion including an NVGRE virtual subnet identifier (VSID);
- determining that the data packet comprises an echo request based on a packet processing exception, wherein the echo request includes the NVGRE VSID located in a payload portion of the echo request, wherein the NVGRE VSID identifies a selected NVGRE segment and is used to generate an echo reply in response to the echo request; and
- determining that the destination node is an intended terminating tunnel end point for the selected NVGRE segment based on the NVGRE VSID;
- in response to determining that the destination node is the intended terminating tunnel end point for the selected NVGRE segment, generating the echo reply, the echo reply including a port number of the destination node, wherein the echo reply is matched with the echo request based on the port number to determine whether there is a failure in the selected NVGRE segment.

17. The non-transitory computer readable medium of claim 16, wherein the packet processing exception is one of a router alert or a destination address in a 127/8 address range.

18. The non-transitory computer readable medium of claim 16, wherein the echo request in the data packet includes the port number of the destination node.

19. The non-transitory computer readable medium of claim 16, wherein the echo request comprises a header having a format associated with an Internet Protocol technology.

20. The non-transitory computer readable medium of claim 16, the operations further comprising:
- generating the echo reply in response to a reply via an IP packet mode in the echo request; and
- transmitting the echo reply to a sender of the echo request.

* * * * *